US011902435B1

(12) United States Patent
Marosi-Bauer et al.

(10) Patent No.: US 11,902,435 B1
(45) Date of Patent: Feb. 13, 2024

(54) ACCESS CONTROL INTERFACES FOR BLOCKCHAINS

(71) Applicant: CUBE Security Inc., Hermosa Beach, CA (US)

(72) Inventors: Attila Marosi-Bauer, Üröm (HU); Einaras von Gravrock, Hermosa Beach, CA (US); Sean Tiernan, Arroyo Grande, CA (US); Jonas Lekevicius, Vilnius (LT)

(73) Assignee: CUBE Security Inc., Palo Alto, CA (US)

( * ) Notice: Subject to any disclaimer, the term of this patent is extended or adjusted under 35 U.S.C. 154(b) by 0 days.

(21) Appl. No.: 17/984,175

(22) Filed: Nov. 9, 2022

Related U.S. Application Data

(60) Provisional application No. 63/390,860, filed on Jul. 20, 2022.

(51) Int. Cl.
*H04L 9/08* (2006.01)
*H04L 9/00* (2022.01)

(52) U.S. Cl.
CPC ............ *H04L 9/088* (2013.01); *H04L 9/0894* (2013.01); *H04L 9/50* (2022.05)

(58) Field of Classification Search
CPC .......... H04L 9/088; H04L 9/0894; H04L 9/50
See application file for complete search history.

(56) References Cited

U.S. PATENT DOCUMENTS

| 10,554,654 | B1* | 2/2020 | Ramanathan | H04L 63/104 |
| 11,100,197 | B1* | 8/2021 | Bernardi | H04L 9/50 |
| 2018/0315143 | A1* | 11/2018 | Rang | G06Q 50/186 |
| 2019/0310883 | A1* | 10/2019 | Wang | G06F 9/545 |
| 2020/0036687 | A1* | 1/2020 | May | H04W 12/02 |
| 2020/0057622 | A1* | 2/2020 | Shtein | G06F 8/41 |
| 2020/0213117 | A1* | 7/2020 | Resch | H04L 9/3268 |
| 2020/0313858 | A1* | 10/2020 | Feng | H04L 9/3247 |
| 2020/0314095 | A1 | 10/2020 | Jentzsch et al. | |

(Continued)

OTHER PUBLICATIONS

PCT International Search Report and Written Opinion, PCT Application No. PCT/US2023/024878, dated Sep. 20, 2023, 15 pages.

*Primary Examiner* — Taghi T Arani
*Assistant Examiner* — Blake I Narramore
(74) *Attorney, Agent, or Firm* — Fenwick & West LLP

(57) ABSTRACT

An access control server may store a private cryptographic key. The private cryptographic key corresponds to a public cryptographic key. The public cryptographic key is stored on a blockchain as part of an autonomous program protocol. The access control server may receive access control setting related to the autonomous program protocol. The access control server may receive a request for accessing the autonomous program protocol stored on the blockchain. The access control server may review the request. The access control server may determine the request is in compliance with the policies specified in the setting. The access control server may create, using the private cryptographic key, a digital signature for the request and generate a response including the digital signature. A successful verification of the digital signature using the public cryptographic key stored in the autonomous program protocol is required by the autonomous program protocol to process the request.

21 Claims, 8 Drawing Sheets

(56) References Cited

U.S. PATENT DOCUMENTS

| | | |
|---|---|---|
| 2020/0334668 A1 | 10/2020 | Nicli et al. |
| 2021/0184842 A1* | 6/2021 | Nix ..................... H04L 9/3263 |
| 2021/0288918 A1* | 9/2021 | Sciancalepore ........ G06Q 10/00 |
| 2022/0045868 A1* | 2/2022 | Falk ..................... H04L 9/3268 |
| 2022/0174052 A1* | 6/2022 | Blank ................... H04L 63/18 |
| 2022/0247818 A1* | 8/2022 | Ragothaman ....... H04L 67/1095 |
| 2022/0283886 A1* | 9/2022 | Brown ................ H04W 12/068 |
| 2022/0321364 A1* | 10/2022 | Sholtis ................... H04L 9/30 |
| 2022/0385477 A1* | 12/2022 | Kravitz ................. H04L 9/3247 |
| 2023/0008976 A1* | 1/2023 | Xu ......................... H04L 9/50 |

* cited by examiner

ACCESS CONTROL INTERFACES FOR BLOCKCHAINS

CROSS REFERENCE TO RELATED APPLICATION

This application claims the benefit of U.S. Provisional Application No. 63/390,860 filed Jul. 20, 2022, the content of which is incorporated by reference herein in its entirety.

FIELD

The disclosure generally relates to access control security and, more specifically, to architecture of access control for program protocol recorded on a blockchain.

BACKGROUND

The blockchain and smart contract ecosystem currently do not provide an efficient and secure solution to extending contracts' built-in security. Application developers have minimal control over their application after it has been published and do not have the chance to protect them if this is not pre-coded in the contract. Smart contracts are applications inside blockchains which means that they inherited all the security capabilities that blockchain has. However, as an application, it lacks various security features that may protect the application from malicious attacks.

SUMMARY

Embodiments relate to a computer-implemented method, including: storing a private cryptographic key, wherein the private cryptographic key corresponds to a public cryptographic key, a copy of the public cryptographic key is stored on a blockchain as part of an autonomous program protocol; receiving access control setting related to the autonomous program protocol, the access control setting specifying one or more policies in granting access to the autonomous program protocol; receiving a request for accessing the autonomous program protocol stored on the blockchain; reviewing metadata associated with the request and request content; determining, based at least on the metadata associated with the request, the request is in compliance with the one or more policies specified in the access control setting; creating, using the private cryptographic key, a digital signature for the request; and generating a response to the request, the response including the digital signature, wherein a successful verification of the digital signature using the public cryptographic key stored in the autonomous program protocol is required by the autonomous program protocol to process the request.

In some embodiments, the techniques described herein relate to a computer-implemented method, wherein the digital signature includes context data of the request, such as call data, parameters, functions, nonce, and other account-related data.

In some embodiments, the techniques described herein relate to a computer-implemented method, wherein the request includes a function call to the autonomous program protocol, and the autonomous program protocol is a smart contract.

In some embodiments, the techniques described herein relate to a computer-implemented method, wherein the access control setting includes settings with respect to a plurality of function calls.

In some embodiments, the techniques described herein relate to a computer-implemented method, wherein the access control setting with respect to one of the function calls is unrestricted and the digital signature for the request with respect to the one of the function calls is generated unconditionally. For example, in one case, signature may be generated without a policy. In another case, there would be functions that do not require any signature at all to be processed.

In some embodiments, the techniques described herein relate to a computer-implemented method, wherein determining the request is in compliance with the one or more policies is conducted using a machine learning model.

In some embodiments, the techniques described herein relate to a computer-implemented method, wherein the private cryptographic key is stored at an access control server, and the autonomous program protocol contains code that is generated by the access control server.

In some embodiments, a non-transitory computer-readable medium that is configured to store instructions is described. The instructions, when executed by one or more processors, cause the one or more processors to perform a process that includes steps described in the above computer-implemented methods or described in any embodiments of this disclosure. In some embodiments, a system may include one or more processors and memory coupled to the processors that is configured to store instructions. The instructions, when executed by one or more processors, cause the one or more processors to perform a process that includes steps described in the above computer-implemented methods or described in any embodiments of this disclosure.

The figures depict, and the detail description describes, various non-limiting embodiments for purposes of illustration only.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
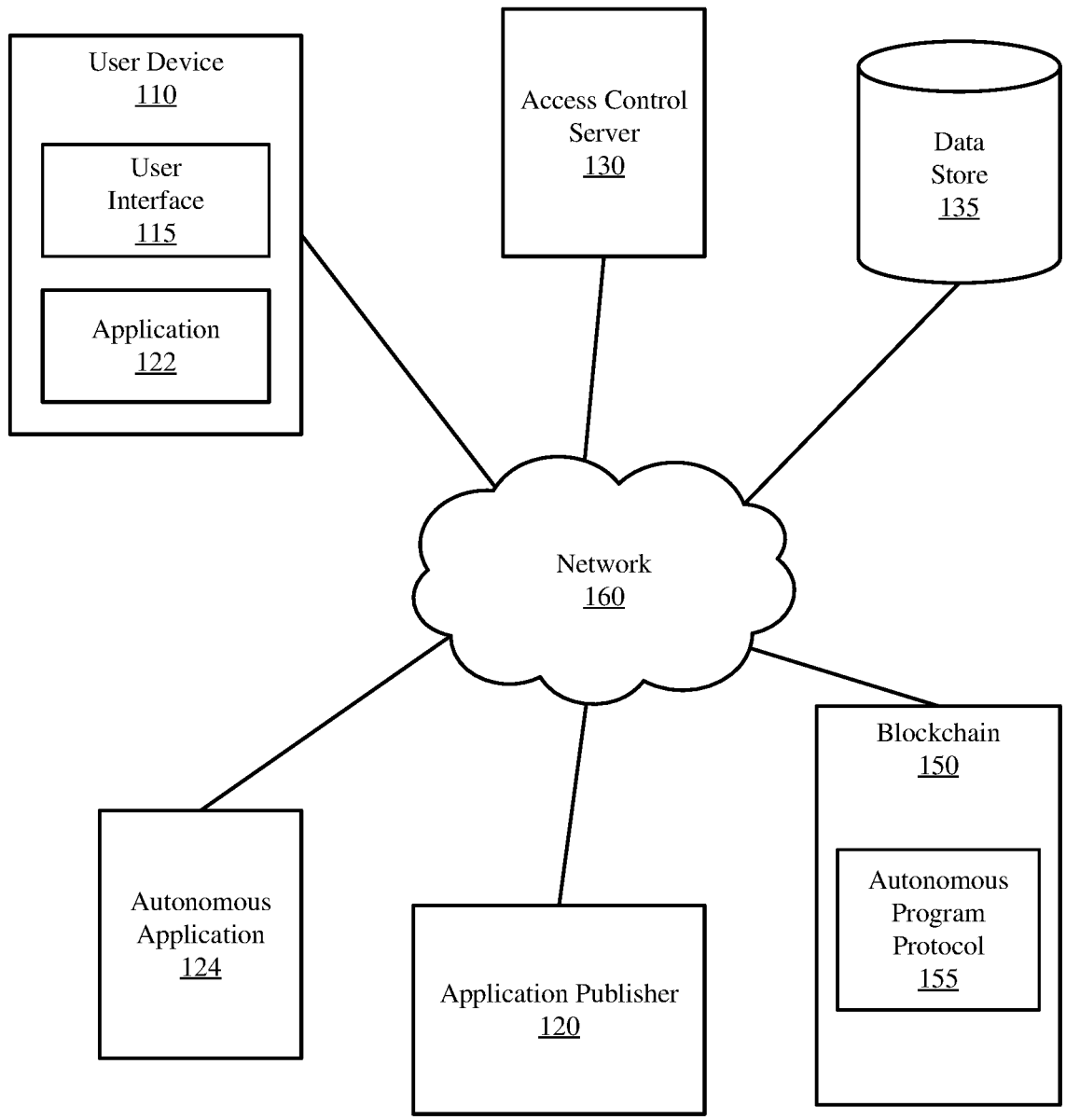
(FIG. 1 is a block diagram that illustrates a system environment of an example computing server, in accordance with an embodiment.

FIG. (FIG. 1 is a block diagram that illustrates a system environment 100 of an example computing server, in accordance with an embodiment. By way of example, the system environment 100 includes a user device 110, an application publisher 120, an access control server 130, a data store 135, a blockchain 150, and an autonomous program protocol 155. The entities and components in the system environment 100 communicate with each other through the network 160. In various embodiments, the system environment 100 may include different, fewer, or additional components. The components in the blockchain system environment 100 may each correspond to a separate and independent entity or may be controlled by the same entity. For example, in one embodiment, the access control server 130 may control the data store 135.

While each of the components in the system environment 100 is often described in disclosure in a singular form, the system environment 100 may include one or more of each of the components. For example, there can be multiple user devices 110 communicating with the access control server 130 and the blockchain 150. Also, the access control server 130 may provide service for multiple application publishers 120, each of whom has multiple end users that may operate different user devices 110. While a component is described in a singular form in this disclosure, it should be understood that in various embodiments the component may have multiple instances. Hence, in the system environment 100, there can be one or more of each of the components.

A user device may also be referred to as a client device. A user device 110 may be controlled by a user who may be the customers of the application publisher 120, the access control server 130, or a participant of the blockchain 150. In some situations, a user may also be referred to as an end user, for example, when the user is the application publisher's customer who uses applications that are published by the application publisher 120. The user device 110 may be any computing device. Examples of user devices 110 include personal computers (PC), desktop computers, laptop computers, tablet computers, smartphones, wearable electronic devices such as smartwatches, or any other suitable electronic devices.

The user device 110 may include a user interface 115 and an application 122. The user interface 115 may be the interface of the application 122 and allow the user to perform various actions associated with application 122. For example, application 122 may be a distributed application and the user interface 115 may be the frontend. The user interface 115 may take different forms. In one embodiment, the user interface 115 is a software application interface. For example, the application publisher 120 may provide a front-end software application that can be displayed on a user device 110. In one case, the front-end software application is a software application that can be downloaded and installed on a user device 110 via, for example, an application store (App store) of the user device 110. In another case, the front-end software application takes the form of a webpage interface of the application publisher 120 that allows clients to perform actions through web browsers. The front-end software application includes a graphical user interface (GUI) that displays various information and graphical elements. In another embodiment, user interface 115 does not include graphical elements but communicates with the application publisher 120 via other suitable ways such as command windows or application program interfaces (APIs).

An application publisher 120, such as a software company, may be an entity that provides various types of software applications. The application publisher 120 may publish and/or operate various types of applications, such as application 122 that is installed at a user device 110, an autonomous application 124 that may be a decentralized application that is run on a decentralized network or blockchain, and the autonomous program protocol 155 that is recorded on a blockchain 150. The autonomous program protocol 155 may take the form of a smart contract or another type of autonomous algorithm that operates on a blockchain. The autonomous application 124 and autonomous program protocol 155 may be applications that have similar natures. In some embodiments, the autonomous application 124 may also operate on a blockchain and the autonomous application 124 is an example of autonomous program protocol 155. In some embodiments, the autonomous application 124 may serve as an interface of the autonomous program protocol 155. For example, the autonomous application 124 may allow a user to access one or more functions of the autonomous program protocol 155 through the interface of autonomous application 124. In some embodiments, the application publisher 120 may record a fully autonomous application on the blockchain 150 as the autonomous program protocol 155 and operate different applications, such as the application 122 and autonomous application 124 to allow a user, a device, or an automated agent to interact with the autonomous program protocol 155. In some embodiments, as discussed in further detail below throughout this disclosure, the autonomous program protocol 155 published by the application publisher 120 may incorporate certain protocols (e.g., access control protocols) of the access control server 130 to provide security and access control to the autonomous program protocol 155.

An access control server 130 may be a centralized server that provides various access control services to provide security to an autonomous program protocol 155 recorded on the blockchain 150 and protect the autonomous program protocol 155 from malicious attacks. The services provided by the access control server 130 may include firewall, access control, sandbox testing environment, authentication (e.g., two-factor authentication), authorization, and other suitable cybersecurity services and compliance (e.g., Know Your Customers KYC) services. In one embodiment, the access control server 130 may be partially centralized and partially decentralized. For example, certain access control policies (e.g., who may access the autonomous program protocol 155) may be specified by an application publisher 120 and centrally enforced by the access control server 130. In some embodiments, the access control server 130 may also be decentralized and certain services such as authentication services can be carried out autonomously. The detail of the operations and sub-components of the access control server 130 will be further discussed in association with FIG. 2.

The data store 135 includes one or more storage units such as memory that takes the form of non-transitory and non-volatile computer storage medium to store various data. The computer-readable storage medium is a medium that does not include a transitory medium such as a propagating signal or a carrier wave. The data store 135 may be used by the access control server 130 to store data related to the access control server 130, such as access control policies of various autonomous program protocols 155 and associated authentication criteria. In one embodiment, the data store 135 communicates with other components by the network 160. This type of data store 135 may be referred to as a cloud storage server. Example cloud storage service providers may include AMAZON AWS, DROPBOX, RACKSPACE CLOUD FILES, AZURE BLOB STORAGE, GOOGLE CLOUD STORAGE, etc. In another embodiment, instead of a cloud storage server, the data store 135 is a storage device that is controlled and connected to the access control server 130. For example, the data store 135 may take the form of memory (e.g., hard drives, flash memory, discs, ROMs, etc.) used by the access control server 130 such as storage devices in a storage server room that is operated by the access control server 130.

A blockchain 150 may be a public blockchain that is decentralized, a private blockchain, a semi-public blockchain, an execution layer settling data on a public blockchain (e.g., Layer 2 blockchains, rollups), or an application-specific chain. A public blockchain network includes a plurality of nodes that cooperate to verify transactions and generate new blocks. In some implementations of a blockchain, the generation of a new block may also be referred to as a proposal process, which may be a mining process or a validation process. Some of the blockchains 150 support smart contracts, which are a set of code instructions that are stored on a blockchain 150 and are executable when one or more conditions are met. Smart contracts may be examples of autonomous program protocols 155. When triggered, the set of code instructions of a smart contract may be executed by a computer such as a virtual machine of the blockchain 150. Here, a computer may be a single operation unit in a conventional sense (e.g., a single personal computer) or may be a set of distributed computing devices that cooperate to execute the code instructions (e.g., a virtual machine or a distributed computing system). A blockchain 150 may be a new blockchain or an existing blockchain such as BITCOIN, ETHEREUM, EOS, NEO, SOLANA, AVALANCHE, etc.

The autonomous program protocols 155 may be tokens, smart contracts, Web3 applications, autonomous applications, distributed applications, decentralized finance (DeFi) applications, protocols for decentralized autonomous organizations (DAO), non-fungible tokens (NFT), decentralized exchanges, identity services, blockchain gaming, metaverse protocols, and other suitable protocols and algorithms that may be recorded on a blockchain.

The communications among the user device 110, the access control server 130, the autonomous application 124, the application publisher 120 and the blockchain 150 may be transmitted via a network 160, for example, via the Internet. In one embodiment, the network 160 uses standard communications technologies and/or protocols. Thus, the network 160 can include links using technologies such as Ethernet, 802.11, worldwide interoperability for microwave access (WiMAX), 3G, 4G, LTE, 5G, digital subscriber line (DSL), asynchronous transfer mode (ATM), InfiniB and, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 160 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 160 also includes links and packet switching networks such as the Internet.

Example Computing Server

Figure 2:
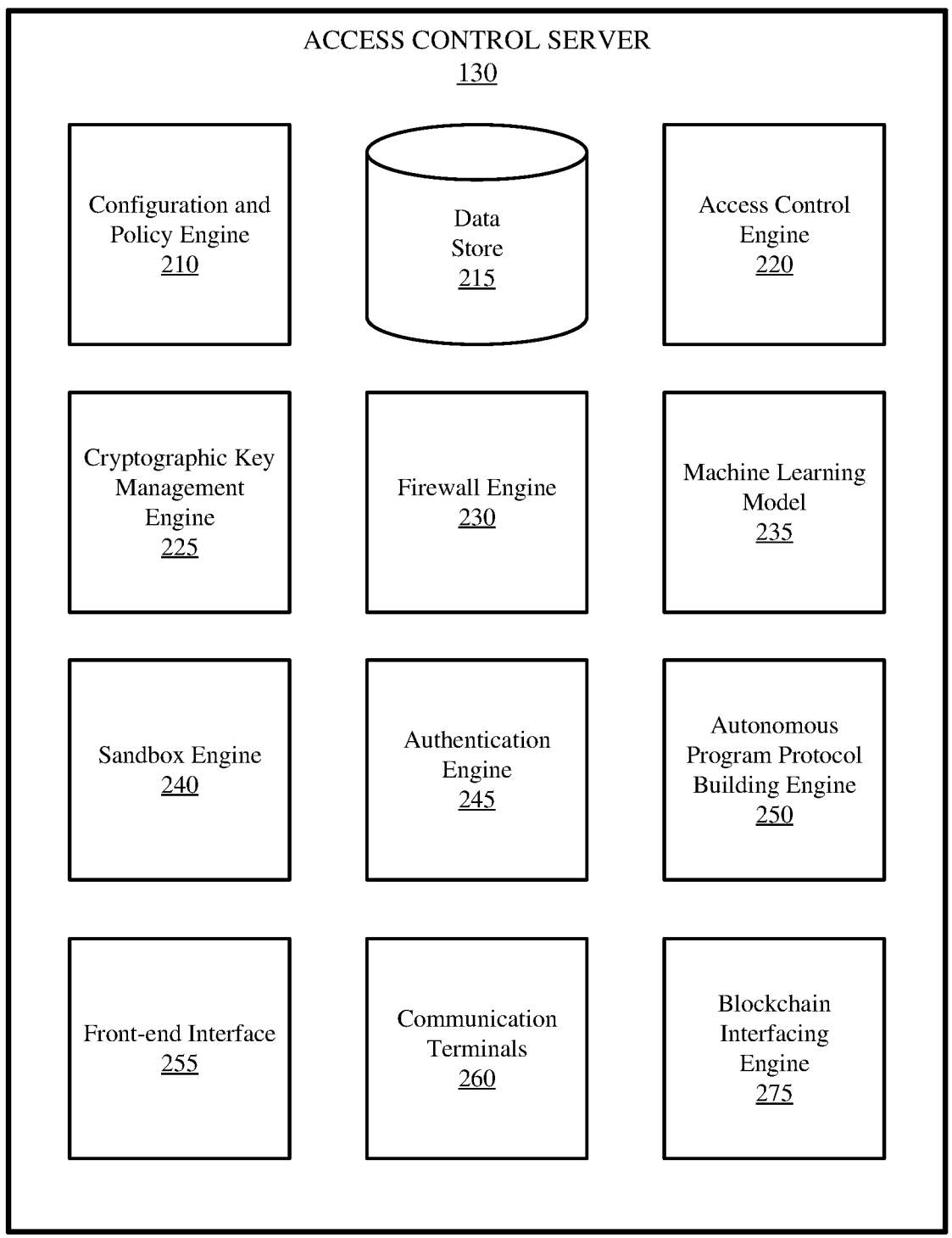
FIG. 2 is a block diagram representing an example access control server, in accordance with an embodiment.

FIG. 2 is a block diagram representing an example access control server 130, in accordance with an embodiment. In the embodiment shown in FIG. 2, the access control server 130 includes configuration and policy engine 210, account store 215, access control engine 220, cryptographic key management engine 225, firewall engine 230, machine learning model 235, sandbox engine 240, authentication engine 245, autonomous program protocol building engine 250, front-end interface 255, communication terminals 260, and blockchain interfacing engine 275. The functions of the access control server 130 may be distributed among different components in a different manner than described below. Also, in various embodiments, the access control server 130 may include different, fewer, and/or additional components.

While the access control server 130 is used in a singular form, the access control server 130 may include one or more computers that include one or more processors and memory. The memory may store computer code that includes instructions. The instructions, when executed by one or more processors, cause the processors to perform one or more processes described herein. The access control server 130 may take different forms. In one embodiment, the access control server 130 is a single computer that executes code instructions directly. In another embodiment, the access control server 130 is a group of computing devices that communicate with each other. The computing devices may be located geographically at the same (e.g., a server room) or different locations. In yet another embodiment, the access control server 130 includes multiple nodes that operate in a distributed fashion such as in cloud computing or distributed computing. Each node may include one or more computing devices operating together. For example, in some embodiments, the access control server 130 is decentralized and is operated by different nodes cooperatively to form the access control server 130. In some cases, the access control server 130 may also include virtual machines. Any computing devices, nodes, virtual machines, singular or plural, may simply be referred to as a computer, a computing device, or a computing server. Components of the access control server 130 shown in FIG. 2, individually or in combination, may be a combination of hardware and software and may include all or a subset of the example computing system illustrated and described in FIG. 8.

The configuration and policy engine 210 may store and determine rules for various participants in the application environment 100. A policy may be defined and initiated by an application publisher 120 or automatically added or defined by the access control server 130. An application publisher 120 may transmit the policy setting to, or build the policy at, the access control server 130. The configuration and policy engine 210 translates the policy to one or more configurations in the system environment 100. A policy may be an access control policy for an autonomous program protocol 155. The access control server 130 provides security, protection, and access control to an autonomous program protocol 155. An application publisher 120 may specify one or more access control settings that define various criteria for granting access to an autonomous program protocol 155. For example, the access control settings may define who can gain access to an autonomous program protocol 155 and the manner in how a party may access the autonomous program protocol 155. The settings may also define trusted entities in authentication and various security rules in controlling the traffic related to the autonomous program protocol 155. The settings may further define authorization and an access control list that may be specific to an autonomous program protocol 155.

A policy may be generic or specific. A specific policy may be a policy that is customized or specified by an application publisher 120 who published an autonomous program protocol 155. A specific policy defines a special rule with respect to the security or access control of the autonomous program protocol 155. For example, an application publisher 120 may define a context-specific policy on the access control of the autonomous program protocol 155. In contrast, a generic policy may be a policy that is commonly beneficial to many autonomous program protocols 155 and may be automatically enforced by the access control server 130 upon request without having the application publisher 120 specifically define the rules in the generic policy. For example, a generic policy may be a policy to prevent the autonomous program protocol 155 from a denial-of-service attack or a policy that detects fraudulent transactions. The configuration and policy engine 210 may include default rules for a generic policy and may enforce a generic policy for various autonomous program protocols 155 that are vulnerable to common security threads.

The data store 215 is a database that stores various information with respect to settings provided by customers, such as application publishers 120, of the access control server 130. The data stored may include a profile of the customer, applications operated by the customer, autonomous program protocols 155 published by the customer, and various access control settings associated with an autonomous program protocol 155. The data store 215 may also include or be in communication with a credential vault that stores user identifiers and passwords and the access control server 130 may perform authentication on behalf of a customer. The data store 215 may also store data and metadata related to various transactions involving an autonomous program protocol 155. The transaction records may be used as training samples in one or more machine learning models for identifying normal usage patterns of an autonomous program protocol 155 in distinguishing normal operations from potentially fraudulent operations or malicious activities.

The access control engine 220 manages the access control of an autonomous program protocol 155 based on the policy settings specified by an application publisher 120. The access control engine 220 may deploy other engines, such as the firewall engine 230, the machine learning model 235, the sandbox engine 240, and the authentication engine 245 to manage the access of an autonomous program protocol 155. The access control engine 220 may control traffic, identify threats, and enforce authentication and authorization for an autonomous program protocol 155. For example, the access control engine 220 may control whether a request to access autonomous program protocol 155 is valid and authorized. The request to access may include a function call of the autonomous program protocol 155. If a request is valid and authorized, the access control engine 220 may generate a digital signature for the request. For example, the access control engine 220 may use a private cryptographic key of the access control server 130 to sign the payload of the request. The private cryptographic key may be specific to the particular autonomous program protocol 155. The digital signature may be a requirement for autonomous program protocol 155 to recognize the request. In some embodiments, the autonomous program protocol 155 may store the public cryptographic key of the access control server 130 that corresponds to the private cryptographic key. The autonomous program protocol 155 may be configured to use the public cryptographic key to verify the digital signature before a function call may be invoked. If the access control engine 220 determines that the request is not valid or authorized, a digital signature is not generated and the access control engine 220 may block the request and log the request as part of the record. The access control engine 220 may also return an error message to the requester. If the autonomous program protocol 155 is configured to require the digital signature of the access control server 130 before a function is invoked, the party sending the request will not be able to gain access to autonomous program protocol 155 without authorization from the access control engine 220.

The access control for an autonomous program protocol 155 may be function specific. For example, an autonomous program protocol 155 may include more than one function call that can be invoked. The application publisher 120 may specify different access control policies for each of the function calls. For example, for certain function calls, the application publisher 120 may allow the general public to use those functions and the access control policies may be more lenient, such as allowing the use without authentication. In some cases, the application publisher 120 may request the access control server 130 to generate digital signatures for all of the requests for those public functions so long as the requests are not malicious. In some cases, the application publisher 120 may even allow the access control server 130 to sign all of the requests regardless of the situation so that access control is essentially bypassed in this type of situation. In some cases, function variants with different methods of authorization may be available on the autonomous program protocols 155. Multiple entry functions may use a combination of signature requirement, oracle list checking, allowlist checking, or no additional security checks. These functions may call the same private function for the autonomous program protocol logic. For other function calls, such as those related to premium functions that are offered to only certain users, such as paid subscribers, the application publisher 120 may specify access control policies that require authentication and authorization before the access control server 130 generates a digital signature for a request that tries to invoke one of those function calls. Restricted functions may also be available only for verified customers such as compliant users for compliance and "know your customer" purposes.

The nature of access control may vary for different autonomous program protocols 155, depending on how an application publisher 120 specifies the policies. For example, in some cases, the access control engine 220 may provide firewall service to an autonomous program protocol 155 and protect the autonomous program protocol 155 from malicious attacks. In some cases, the access control engine 220 may provide an authentication service to limit access to another autonomous program protocol 155. In some cases, the access control engine 220 may use one or more machine learning models 235 to identify abnormal patterns and traffic related to an autonomous program protocol 155 and may react to any potential malicious attack such as by blocking access attempts (e.g., not generating digital signatures) from parties that are identified as potential malicious parties. The type of suitable access controls vary among embodiments and may be decided by an application publisher 120 who specifies various policies for an autonomous program protocol 155.

The cryptographic key management engine 225 stores and manages one or more keys of the access control server 130 to allow the access control server 130 to participate in various blockchains and to generate digital signatures for requests to access autonomous program protocols 155. The cryptographic key management engine 225 stores various private cryptographic keys of the access control server 130. In some embodiments, the access control server 130 may use master private cryptographic keys for different autonomous program protocols 155. In some embodiments, for each autonomous program protocol 155, the cryptographic key management engine 225 may generate a new pair of private and public cryptographic keys. The cryptographic key management engine 225 keeps the private cryptographic key secret and may publish the public cryptographic key to be included in the autonomous program protocol 155, at a location on the blockchain 150, or at a certificate authority. In some embodiments, upon a request from an application publisher 120, the cryptographic key management engine 225 generates a pair of private-public cryptographic keys and sends the public cryptographic key to be incorporated in an autonomous program protocol 155 to be recorded on a blockchain 150. The autonomous program protocol 155 may be configured to require verification of the digital signature using the public cryptographic key before all or certain functions in the autonomous program protocol 155 may be called. In some embodiments, multiple private-public cryptographic key pairs may be generated and multiple public cryptographic keys may be saved in the autonomous program protocol 155. Aggregated signatures may be used for certain functions.

In some embodiments, the access control server 130 may also participate in activities of various blockchains 150, such as performing transactions on blockchains 150. For a blockchain 150, the cryptographic key management engine 225 may maintain one or more private keys to allow the access control server 130 to generate blockchain addresses of the access control server 130 and to validate that access control server 130 owns the blockchain-based units that are connected to one or more public cryptographic keys of the access control server 130. In various embodiments, a blockchain address of the access control server 130 may be generated by a series of one or more one-way functions from the public key, which is generated from the private key. The cryptographic key management engine 225 may derive a blockchain address by hashing the public key, adding prefixes, suffixes, and/or versions to the hash or the public key, creating a checksum, encoding a derived result, and truncating the address.

The firewall engine 230 may be part of the access control engine 220 and provide network security for an autonomous program protocol 155 by monitoring and controlling incoming and outgoing network traffic based on one or more security rules that are specified by an application publisher 120. For example, the autonomous program protocol 155 may be configured to require a digital signature or another suitable authorization label from the access control server 130 in order to invoke a function of the autonomous program protocol 155. In some embodiments, the network traffic related to the autonomous program protocol 155 is routed to the access control server 130 first for the access control server 130 to monitor the traffic. The access control server 130 may track and filter network traffic based on rules that are determined by the application publisher 120. The access control server 130 may maintain, in the data store 215, an access control list that contains a list of permissions associated with the autonomous program protocol 155. The firewall engine 230 may implement various existing firewall techniques in controlling the access to the autonomous program protocol 155. The firewall engine 230 may implement one or more Internet security protocols, such as transport layer security, and may flag or isolate requests that do not pass the security protocols.

The access control server 130 may include one or more machine learning models 235 that are trained to identify potentially malicious activities, threats, fraudulent transactions or otherwise noncompliant activities that attempt to access an autonomous program protocol 155. The access control server 130 may rely on both predetermined security rules that are specified by an application publisher 120 to identify any invalid or unauthorized requests and a machine learning model 235 that predicts whether a request may be noncompliant even if the request complies with the security rules. How the application publisher 120 or the access control server 130 may define what activity is noncompliant may depend on the context of the autonomous program protocol 155. For example, if the autonomous program protocol 155 is a DeFi application, a machine learning model 235 may be trained to identify potentially fraudulent transactions that may involve maximal extractable value (MEV) transactions, money laundering transaction, or other illegal business activities. In another instance, the autonomous program protocol 155 may be an application that provides utility to a company. A machine learning model 235 may be trained to identify potential Internet attacks such as denial-of-access attacks so that the autonomous program protocol 155 is protected from malicious activities.

A machine learning model 235 may be part of the access control engine 220 and may receive various data and contextual information related to an attempted request for accessing an autonomous program protocol 155 to predict whether the request may be noncompliant. The input of the machine learning model 235 may include IP address of the request, the function call in the request, the purported identity of the requestor, parameters used in the request, date and time of the request, frequency of the request, usage patterns of the autonomous program protocol 155, authentication information of the request, past activities of the requester, past activities of other relevant users, client data (e.g., wallet data, browser data, operating system data), cookies, user behavior on an application frontend, other activities by other users on the blockchain (e.g., to detect correlated attacks), smart contract code (e.g., both source code, if available, and binary code), geographical location estimations from IP addresses, and other suitable information. A machine learning model 235 may be trained using past transaction instances as training samples. For example, the data and contextual information related to past transaction instances may be stored in the data store 215. Each training sample may be stored as a feature vector that includes the data and contextual information as the dimensions of the vector. Each of the past transactions may be labeled as compliant or noncompliant. In some cases, the training samples may also be multi-classes and are labeled with different noncompliant activities. Each training label may have multiple dimensions. Based on the feature vectors and the training labels of past transaction instances, the machine learning model 235 may be trained to predict whether a future request is compliant or noncompliant.

A sandbox engine 240 may be part of the access control engine 220 and may allow a party that attempts to invoke one or more function calls of the autonomous program protocol 155 to simulate the transaction at the access control server 130 first before actually invoking the autonomous program protocol 155. For example, a party may have a request that is part of a larger algorithm. The request is to be sent to the autonomous program protocol 155 to carry out. The party may use the sandbox engine 240 to simulate the result of the autonomous program protocol 155 carrying out the request and determine whether the result generates the desirable outcome and/or whether the result generates any undesirable side-effects. If the result is satisfactory, the party may request the access control server 130 to digitally sign the actual request and have the request sent to the autonomous program protocol 155.

The authentication engine 245 may be part of the access control engine 220 and may allow an application publisher 120 to request the access control server 130 to carry out authentication procedures before a request for accessing an autonomous program protocol 155 is authorized by the access control server 130. For example, the application publisher 120 may design and publish an autonomous program protocol 155 that is reserved for only certain account holders of the application publisher 120. To prevent an unauthorized party from gaining access to the autonomous program protocol 155, the access control server 130 may carry an authentication process such as verifying the credential of the requester before the access control server 130 authorizes a request for the autonomous program protocol 155. The authentication engine 245 may provide any suitable types of authentication procedures such as two-factor authentication. For example, upon a request is received and the credential is verified, the authentication engine 245 may generate a token code for the requester. The authentication engine 245 may set a time limit for the requester to enter the token code before the authentication engine 245 generates a digital signature to authorize the request.

The autonomous program protocol building engine 250 may be an engine that assists an application publisher 120 to build an autonomous program protocol 155 that incorporates various access control features of the access control server 130 into the autonomous program protocol 155. The autonomous program protocol building engine 250 may allow the application publisher 120 to build an autonomous program protocol 155 such as a smart contract or a Web3 application on the platform provided by the access control server 130 and automatically generate the code that enables the autonomous program protocol 155 to incorporate the access control feature. The autonomous program protocol building engine 250 may include compiler, simulation, and debugging features that allow the application publisher 120 to test and simulate the autonomous program protocol 155 before the autonomous program protocol 155 is recorded on a blockchain. The autonomous program protocol building engine 250 may also publish the finalized autonomous program protocol 155 on behalf of the application publisher 120 on a blockchain 150. In some embodiments, after the code for autonomous program protocol 155 is written, the autonomous program protocol building engine 250 may cause the cryptographic key management engine 225 to generate a new pair of private-public cryptographic keys and store the public cryptographic key as part of the code or a mutable portion (e.g., a variable) of the autonomous program protocol 155. The application publisher 120 may design the autonomous program protocol 155 with multiple function calls. The application publisher 120 may specify which function calls are subject to the access control of the access control server 130. The autonomous program protocol building engine 250 may incorporate the code that requires the autonomous program protocol 155 to use the public cryptographic key to verify the digital signature of the access control server 130 before a function call is invoked. The access control part of the code may be generated automatically by autonomous program protocol building engine 250 or by having the application publisher 120 include a code library published by the access control server 130 and inserting the access control code in the source code of the autonomous program protocol 155.

In various embodiments, the public cryptographic key may be stored in the autonomous program protocol 155 in different manners. In some embodiments, the public cryptographic key may be stored as part of the immutable code of the autonomous program protocol 155. In some embodiments, the public cryptographic key may be stored as a variable that can only be changed by the original owner who published the autonomous program protocol 155. For example, the autonomous program protocol 155 may include an initial function such as a constructor function that is only called when the autonomous program protocol 155 is first recorded on a blockchain 150. The constructor function may define the original owner that is tractable to a wallet address. The original owner, who possess the wallet address, may have the authority to upload a public cryptographic key and modify the public cryptographic key for key rotation purposes or for mitigation of providers of access control server 130. An example relevant part of pseudocode of the autonomous program protocol 155 for implementing the public cryptographic key as a variable for the autonomous program protocol 155 is shown below.

```
contract TestContract {
    address signingAuthorityKey;
    // Signing Authority Key is the public cryptographic
      key of access control
    // server 130.
    address owner;
    modifier onlyOwner( ){
        require(msg.sender==owner, "Action is not permit-
          ted.");
        _;
    }
    constructor( ){
        owner=msg.sender;
    }
    // This function would be called by the owner (devel-
      oper/deployer)
    // when the contract is deployed.
    // The parameter would be the public cryptographic
      key.
    function setSigningAuthorityKey(address signingAu-
      thority) public onlyOwner {
        signingAuthorityKey=signingAuthority;
    }
}
```

The autonomous program protocol building engine 250 may generate the access control part of the autonomous program protocol 155 and also an interface for accessing the autonomous program protocol 155. The interface for accessing the autonomous program protocol 155 may be an application 122, an autonomous application 124, an oracle machine, or another suitable way to interact with the autonomous program protocol 155. For example, the interface may include code that routes any request attempting to reach the autonomous program protocol 155 to access control server 130 first to receive a digital signature from the access control server 130 that indicates the request is authorized by the access control server 130. Upon the receipt of the digital signature, the interface may forward the request for the requester to sign. The user's application (e.g., a wallet) may then send the request to autonomous program protocol 155.

The access control server 130 may include one or more front-end interfaces 255. A front-end interface 255 allows application publishers 120 to manage their profiles, build autonomous program protocol 155, and manage settings related to access control and security level of the autonomous program protocols 155 published by the application publisher 120. The front-end interface 255 may take different forms. A first example of front-end interface 255 is a software application interface that is installed on a user device 110 such as smartphones and computers. A second example front-end interface 255 is a webpage interface of the access control server 130 that allows users to manage their accounts through web browsers. A third example front-end interface 255 is an application program interface (API) of the access control server 130 that allows users to perform actions through program codes and algorithms.

The communication terminal 260 of the access control server 130 provides network and blockchain connections between the access control server 130 and various entities that communicate with the access control server 130. The access control server 130 may serve as a node of various public blockchains to provide up to date information about the state of the blockchain. The access control server 130 may include different terminals such as blockchain terminal, asset exchange terminal, and messaging application terminal. Each terminal may manage a data feed or a webpage that publishes information regarding the related services and server status. Each terminal may also include its individual API.

The blockchain interfacing engine 275 provides various functionalities for the access control server 130 to perform activities on different blockchains 150 that may have their own standards and protocols. The access control server 130 may serve as a node of a blockchain 150 to participate in the mining and data validation process. The blockchain interfacing engine 275 allows access control server 130 to broadcast various transactions to a blockchain network for recordation. For example, the blockchain interfacing engine 275 may publish autonomous program protocol 155 on behalf of an application publisher 120, such as in the situation where the application publisher 120 uses autonomous program protocol building engine 250 to build the autonomous program protocol 155. The blockchain interfacing engine 275 also routinely checks new blocks generated in various blockchains to check whether pending blockchain transactions or actions have been confirmed on the blockchains 150. The blockchains 150 may include public blockchains, consortium blockchains, private blockchains. The degree of decentralization of various blockchains 150 may vary. In one embodiment, the access control server 130 may set the standard and publish its own blockchain 150 that allows the public to participate in the blockchain network.

The blockchain interfacing engine 275 may include a smart contract engine that manages the generation and triggering of various smart contracts that are recorded on different blockchains. A smart contract may be created through a particular programming language that is compatible with a blockchain 150. A smart contract is recorded on a block of the blockchain and may be immutable. The recorded smart contract may include executable code instructions that are triggered by a certain condition. When the condition is met and verified, the code instructions are executed by a computer to automatically execute the contract terms that take the form of code instructions. The computer that executes the smart contract may take various forms. For example, a computer described herein may be a conventional personal computer, a virtual machine for the blockchain, or even a collection of distributed nodes in distributed computing. When the code instructions of the smart contract are executed, the code instructions may cause certain events (e.g., a transaction, a generation of a token, creation of new information) to be recorded on a blockchain. In some embodiments, after a request to access an autonomous program protocol 155 is authorized by the access control server 130, instead of transmitting the digital signature back to the requester, the access control server 130 may directly communicate to the autonomous program protocol 155, such as a smart contract, to initiate the request.

The blockchain interfacing engine 275 may also include an oracle machine that may serve as a data feed for an autonomous program protocol 155. The oracle machine may receive different data from various sources. For example, different parties may provide information and data to the oracle machine. When relevant information is obtained by the oracle machine, some code instructions of the autonomous program protocol 155 may be triggered if certain conditions are met.

Example Access Control System

Figure 3:
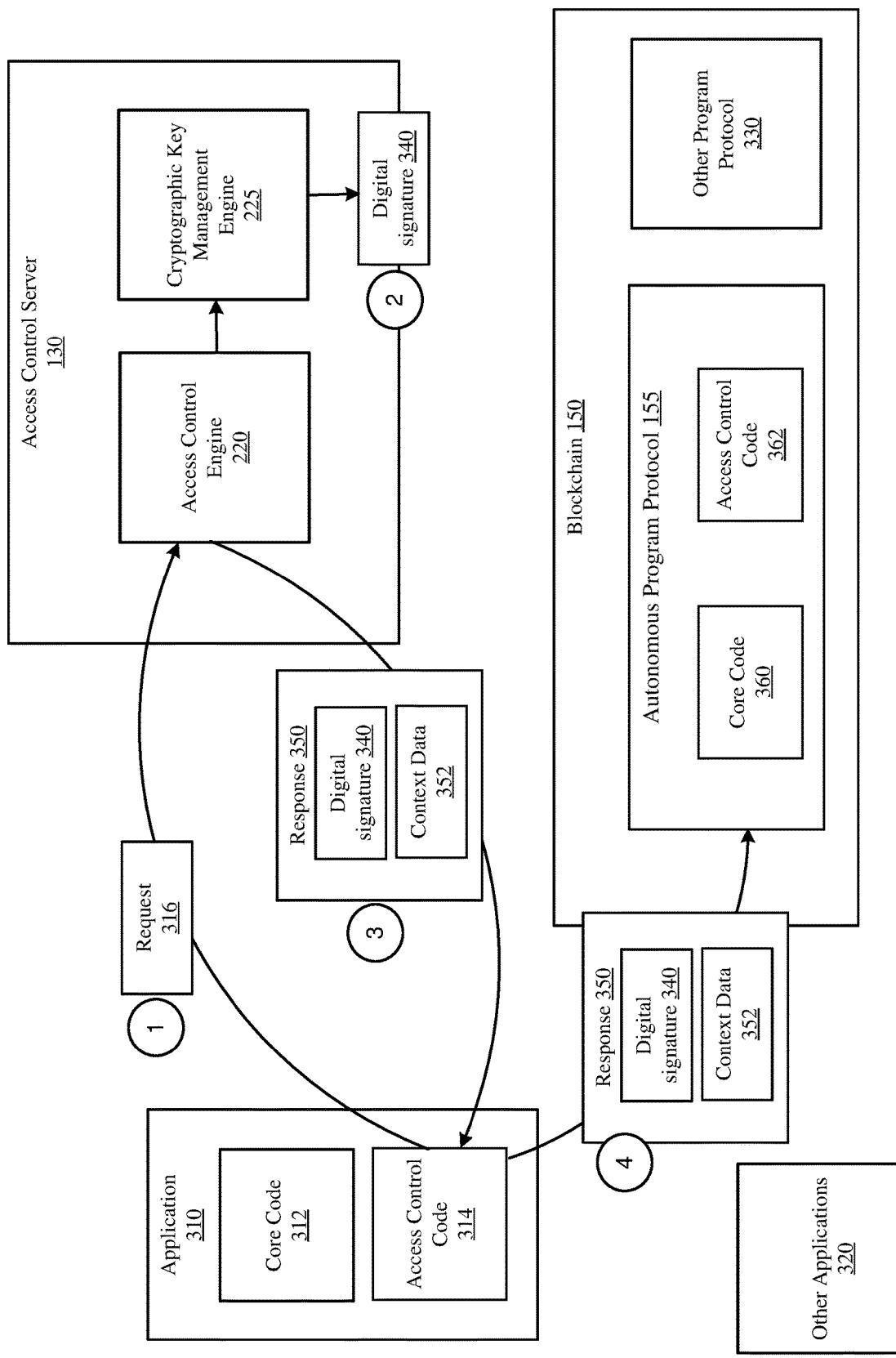
FIG. 3 is a block diagram illustrating an example access control system and the message control flow of the system, in accordance with some embodiments.

FIG. 3 is a block diagram illustrating an example access control system 300 and the message control flow of the system, in accordance with some embodiments. The access control system 300 may be an example of the system environment 100. The access control system 300 may include an application 310, the access control server 130, and an autonomous program protocol 155 recorded on the blockchain 150. The access control system 300 may also include other applications 320 and other program protocols 330 recorded on the blockchain 150.

The application 310 may be an example of application 122 or autonomous application 124, such as a Web3 application. The application 310 may serve as an interface for a party to interact with the autonomous program protocol 155. For example, a user may manually request to initiate an action at the autonomous program protocol 155 through an application 122. An autonomous agent may initiate a request through the autonomous application 124. The application 310 may include the core code 312 which is largely designed by the application publisher 120 and serve as the primary features of the application 310. The application 310 may also include access control code 314 that may be generated by the access control server 130 and control the routing of requests so that the application 310 can communicate with the autonomous program protocol 155 under the access control framework designed by the access control server 130.

The core code 312 may generate a request 316 (e.g., "SmartContracts.methods.setName("NewName").send( )")

directed to the autonomous program protocol 155. The request may also be referred to as an interaction request. The request 316 may include a specific function call of the autonomous program protocol 155 such as "setName" in this example. The access control code 314 may package the function call data together with client data (e.g., user's behavior data, etc.), route the request 316 to the access control server 130 and request the information and digital signature from the access control server 130. Packaging the function call data may include extracting the functions and the parameters included in the functions and hashing the information. In some embodiments, Packaging the function call may also include adding context metadata to the request 316. The access control code 314 causes the application 310 to route the request 316 to the access control server 130.

Upon receiving the request 316, the access control server 130 may analyze the request 316 using the access control engine 220 to determine whether the request 316 is in compliance with access control policies set by the application publisher 120. The analysis may include determining whether the request 316 is authenticated and authorized. The types of analyses that may be performed by access control engine 220 are discussed in further detail in FIG. 2. The access control engine 220 may deploy the firewall engine 230, the machine learning model 235, the sandbox engine 240, the authentication engine 245 and any other suitable access control protocols to analyze the request 316. The access control engine 220 in turn determines whether to authorize the request.

If the access control engine 220 authorizes the request, the access control server 130 may use the cryptographic key management engine 225 to generate a digital signature 340 of the access control server 130 to signify the authorization. The access control server 130 may use a private cryptographic key to sign a version of the request 316. The version of the request 316 may be the request 316 itself, a hash of the request 316, the request 316 with context data. For example, the access control server 130 may use the private cryptographic key to encrypt a version of the request 316 to generate the digital signature 340. The access control server 130 may generate a response 350 for the authorization. The response 350 may include the request 316, context data 352, and the digital signature 340. The response 350 may be transmitted back to the application 310 or transmitted directly to the blockchain 150 to serve as an authorized request. If the response 350 is returned to the application 310, the access control code 314 of the application 310 may cause the response 350 to be transmitted to the blockchain 150.

If the access control engine 220 does not authorize the request 316, the access control server 130 may simply ignore the request 316 or send a simple response to the application 310 that the request 316 is denied. In some cases where the access control server 130 determines that the request 316 may be transmitted by a malicious party, the access control server 130 may also add the requester or an identifier of the application 310 (e.g., IP address, application identifier) to a blocked list.

Upon receiving the response 350 that includes the digital signature 340, the autonomous program protocol 155 may verify the digital signature 340 and execute the function call specified in the request 316. For example, the autonomous program protocol 155 may include core code 360 and access control code 362. Similar to the core code 312, the core code 360 may be largely designed by the application publisher 120 and serve as the primary functions of the autonomous program protocol 155. The access control code 362 may be generated by the access control server 130 and enable the access control of the autonomous program protocol 155. For example, the access control code 362 may store a copy of the public cryptographic key that corresponds to the private cryptographic key used to generate the digital signature 340. The access control code 362 uses the public cryptographic key to decrypt the digital signature 340 and verify the digital signature 340. If the digital signature 340 is verified, the autonomous program protocol 155 will carry out the function call and execute the function in the core code 312 in response to the request 316.

The access control system allows an application publisher 120 to control the access to the autonomous program protocol 155 stored on the blockchain 150. Other applications 320 or other program protocols 330 recorded on the blockchain 150 may not be able to directly communicate or cause the autonomous program protocol 155 to perform any actions without authorization from the access control server 130.

Example Access Control Process

Figure 4:
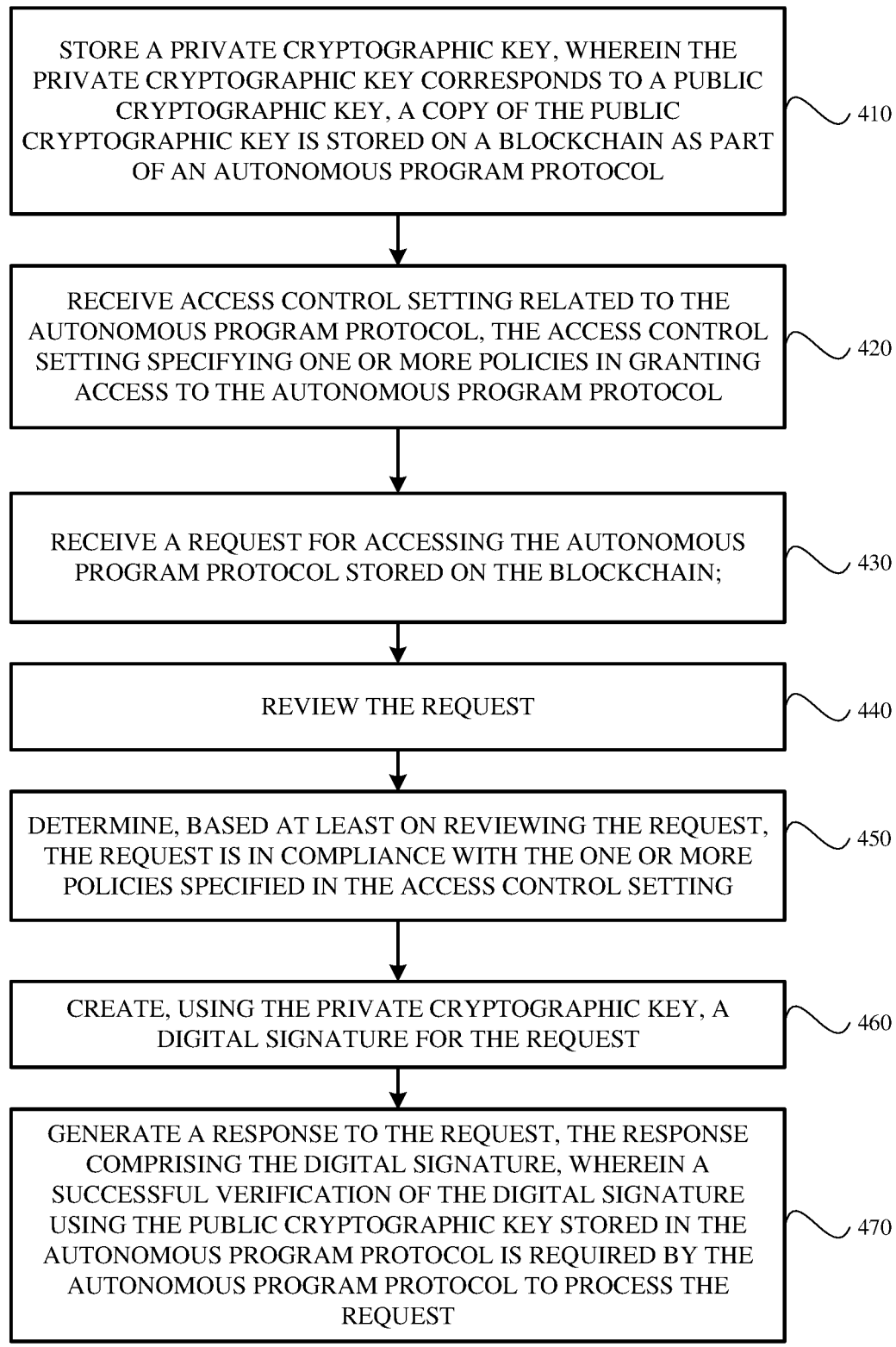
FIG. 4 is a flowchart depicting an example process for providing access control on an autonomous program protocol, in accordance with some embodiments.

FIG. 4 is a flowchart depicting an example process 400 for providing access control on an autonomous program protocol 155, in accordance with some embodiments. The process 400 may be performed by a computing device, such as an access control server 130. The process 400 may be embodied as a software algorithm that may be stored as computer instructions that are executable by one or more processors. The instructions, when executed by the processors, cause the processors to perform various steps in the process 400.

The access control server 130 may store 410 a private cryptographic key. The private cryptographic key corresponds to a public cryptographic key. For example, the access control server 130 may generate a pair of cryptographic keys using the Elliptic Curve Digital Signature Algorithm (ECDSA). The private cryptographic key is kept secret by the access control server 130. The public cryptographic key is published. In some embodiments, a copy of the public cryptographic key is stored on a blockchain 150 as part of an autonomous program protocol 155. For example, the autonomous program protocol 155 may contain access control code 362 that is generated by the access control server 130. In some embodiments, the public cryptographic key is visible in a block of the blockchain 150 as part of the code of the autonomous program protocol 155. In some embodiments, the autonomous program protocol 155 is a smart contract, which includes a set of instructions stored on the blockchain 150.

The access control server 130 may receive 420 access control settings related to the autonomous program protocol 155. The access control setting may specify one or more policies in granting access to the autonomous program protocol 155. The access control setting may include settings with respect to different function calls of the autonomous program protocol 155. For example, in some embodiments, the autonomous program protocol 155 provides different functions and each function may be associated with a different access control setting so that the security level for each function may be different. In some embodiments, an application publisher 120, through the interface provided by the access control server 130, may specify the access control settings for various functions associated with the autonomous program protocol 155. In some cases, the access control setting with respect to one or more function calls may be unrestricted so that any party can gain access to those unrestricted functions. Additional examples of access control settings are discussed in FIG. 2 in association with the access control engine 220.

The access control server 130 may receive 430 a request for accessing the autonomous program protocol 155 stored on the blockchain. An example of the request may be the request 316 shown in FIG. 3. The request may include a function call to the autonomous program protocol 155 and parameters related to the function call. The request may be routed to the access control server 130 for the access control server 130 to determine whether to authorize the request. Additional information such as context information of the request, and metadata of the request (e.g., IP address of the request sender, parameters of the request) may also be received by the access control server 130. In some embodiments, the access control server 130 may also receive (e.g., load from a storage) previous function call requests transmitted by the same requester and previous function call requests by other users that are relevant to the instant transaction.

The access control server 130 may review 440 the request. The access control server 130 may use tools associated with the access control engine 220, including firewall engine 230, machine learning model 235, sandbox engine 240, and authentication engine 245 to review the request. The type of review may depend on the situation and the access control policies specified. For example, the access control server 130 may train a machine learning model 235 to identify potential noncompliant items. In some embodiments, the trace of previous calls may be used to identify a malicious party. For example, a fraudulent person who is to commit a fraudulent activity may follow certain patterns. The access control server 130 may identify the sequence of actions. For example, the access control server 130 may identify past function calls by the requester to holistically determine whether the request may be malicious or otherwise noncompliant. For example, the access control server 130 may keep a stack trace of previous function calls per application 310. In some cases, requests to call a particular function with certain parameters are not inherently malicious but, when combined with another request to another function call with additional parameters, the collection of the requests can become malicious. The access control server 130 may use rule-based models or machine learning models to identify or predict requests that may be noncompliant.

In some embodiments, the application publisher 120 may specify that the autonomous program protocol 155 or certain function calls in the autonomous program protocol 155 are unrestricted or not dangerous. This may occur when the autonomous program protocol 155 is first launched or the application publisher 120 adjusts the security and authorization level of the autonomous program protocol 155 through the access control server 130. For example, the application publisher 120 may decide to open the blockchain 150 to the general public. Since the autonomous program protocol 155, which is already recorded on the blockchain 150, often has become immutable and has been configured to require the digital signature of the access control server 130, the access control code 362 of the autonomous program protocol 155 may continue to require a digital signature before a function call can be invoked. The lowering of security level may be achieved at the access control server 130. For example, the application publisher 120 may mark an autonomous program protocol 155 as unrestricted, the access control server 130 may unconditionally generate a digital signature for each request sent to the access control server 130. The level of security and authorization may be freely adjusted by the publisher application publisher 120 using a platform of the access control server 130. In some embodiments, there can be an on-chain signer that signs requests unconditionally, thus allowing on-chain interactions without an oracle.

The access control server 130 may determine 450, based at least on reviewing the request, the request is in compliance with the one or more policies specified in the access control setting. The determination may be carried out by various access control engines 220 of the access control server 130, including using one or more machine learning models 235. The determination may include a strictly rule-based approach (e.g., whether a request passes the authentication process, whether the request is from an allowlist of IP addresses), a heuristic approach (e.g., using an algorithm that analyzes metadata to predict the nature of the request), a contextual approach (e.g., using contextual data, prior requests, and other factors to determine the nature of the request), a predictive approach (using one or more machine learning models), a simulation approach, or any combination of various approaches. The access control server 130 may train machine learning models to help various publishers identify malicious attacks. An application publisher 120 may also set up rules using the configuration and policy engine 210 to design the determination process.

The access control server 130 may make a determination from a list of possible determination outcomes. For example, the list of possible outcomes may include "allow," "block," "suspicious," "unknown," and "ignored." In some embodiments, the possible outcomes may also depend on the kinds of attacks. In some embodiments, for some attacks the outcomes are binary (sign or not sign) while in other attacks the outcomes may include different possibilities such as likelihoods of fraud, sybil, side-effects, etc. Depending on the rating of the request determined by the access control server 130, the access control server 130 may take different actions. For example, an application publisher 120 may specify what actions that the access control server 130 should take for rating such as "suspicious" and "unknown." For example, in some cases, the access control server 130 may be the unknown request as allowed or ignored, depending on the preference of the application publisher 120. In some cases, for suspicious requests, the access control server 130 may flag the request and notify the application publisher 120 for manual review. Again, how the access control server 130 may handle a rating may be selectable by the application publisher 120.

The access control server 130 may create 460, using the private cryptographic key, a digital signature for the request. For example, the access control server 130 may hash the payload (or part of the payload) of the request and use the private cryptographic key to encrypt the hash to generate the digital signature.

The access control server 130 may generate 470 a response to the request. The response may include a digital signature. Successful verification of the digital signature using the public cryptographic key stored in the autonomous program protocol 155 is required by the autonomous program protocol 155 to process the request. For example, the access control code 362 of the autonomous program protocol 155 may be configured to, upon receiving the request with the digital signature, hash the payload of the request (or part of it), and use the public cryptographic key of the access control server 130 to decrypt the digital signature. In some embodiment, the decryption of the digital signature will generate the hash of the payload of the request that was hashed by the access control server 130. The autonomous program protocol 155 compares the hash generated from hashing the payload of the request and the hash generated from the digital signature. If the hashes match, the digital signature is verified and the autonomous program protocol 155 will carry out the function call(s) specified in the request.

Example Message Flowchart

Figure 5:
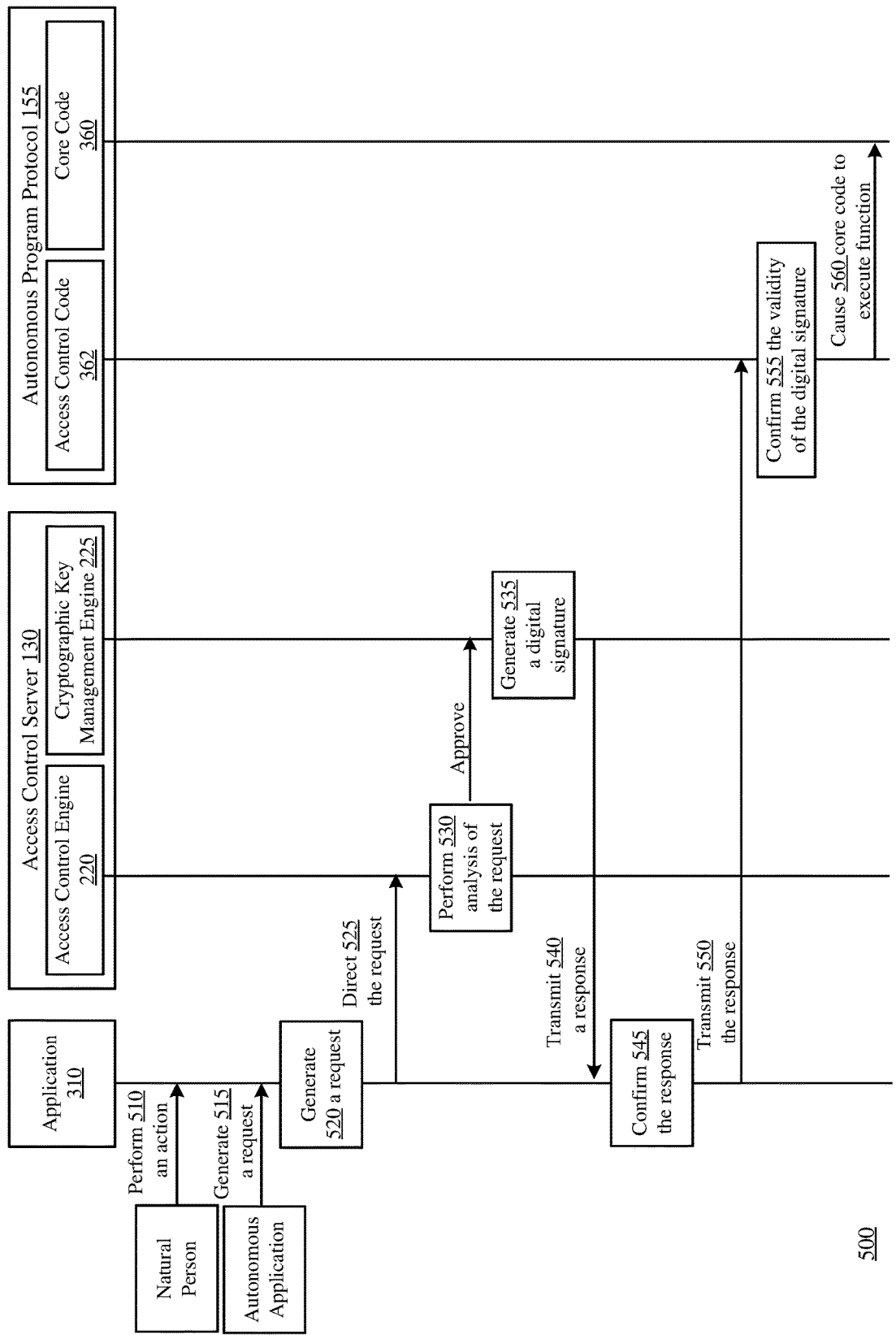
FIG. 5 is a message flowchart depicting an access control process for an autonomous program protocol, in accordance with some embodiments.

FIG. 5 is a message flowchart 500 depicting an access control process for an autonomous program protocol 155, in accordance with some embodiments. The message flowchart 500 may include multiple parties, such as the application 310, the blockchain 150 that includes autonomous program protocol 155, and the access control server 130. The autonomous program protocol 155 may include the core code 360 and the access control code 362. The access control server 130 may include the access control engine 220 and the cryptographic key management engine 225, which may serve as the digital signature signer.

In some embodiments, a natural person, who could be a legitimate requester or a potentially malicious party, of an application performs 510 activities resulting in a request to call a function of the autonomous program protocol 155. In some embodiment, an application itself generates 515 a request to call a function of the autonomous program protocol 155. The application 310, which can be the frontend of the autonomous program protocol 155, generates 520 the request. Instead of sending the request directly to the blockchain network, the access control code of the application 310 packages the function call data and parameters and directs 525 the request to access control server 130 and wait for a response.

In some embodiments, upon receiving the request, the access control server 130 uses the access control engine 220 to perform 530 analysis of the request to determine whether the request is in compliance with one or more access control policy rules associated with the autonomous program protocol 155. If the access control engine 220 determines that the request is in compliance, the cryptographic key management engine 225 uses the private cryptographic key of the access control server 130 to generate 535 a digital signature.

The access control server 130 transmits 540 a response with the digital signature to the application 310. The response with the digital signature is delivered to the application 310 for verification. The application 310 makes 545 the confirmation of the response. The application 310 transmits 550 the request with the digital signature to the access control code 362 of the autonomous program protocol 155.

The access control code 362 of the autonomous program protocol 155 confirms 555 the validity of the digital signature by using the public cryptographic key of the access control server 130 to verify the digital signature. The access control code 362 causes 560 the core code 360 of the autonomous program protocol 155 to execute the function.

Other applications, whether applications in or outside the blockchain 150 may try to call functions directly in the autonomous program protocol 155. However, without the digital signature of the access control server 130, the request will fail.

Example Machine Learning Models

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), transformers, attention models, generative adversial networks (GANs) may also be used. For example, various machine learning models 235 that are used to predict whether a request is noncompliant (e.g., malicious, unauthorized, fraudulent) may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to predict if a request is noncompliant, the training samples may be past transactions labeled with compliant or noncompliant. The labels for each training sample may be binary or multi-class. Labels may be used to indicate which threat(s) are connected to the request: drain, sybil, etc. Binary (has vulnerability or not) and composite multi-class (binary: yes; vulnerabilities: drain) labels may be used. In training a machine learning model for identifying malicious activities, the training samples may be past transactions with contextual data of those transactions. In some cases, an unsupervised learning technique may be used. The samples used in training are not labeled. Various unsupervised learning technique such as clustering may be used. For example, noncompliant requests may follow certain patterns and may be clustered together by an unsupervised learning technique. In some cases, the training may be semi-supervised with training set having a mix of labeled samples and unlabeled samples.

A machine learning model may be associated with an objective function, which generates a metric value that describes the objective goal of the training process. For example, the training may intend to reduce the error rate of the model in predicting whether a request is noncompliant. In such a case, the objective function may monitor the error rate of the machine learning model. Such an objective function may be called a loss function. Other forms of objective functions may also be used, particularly for unsupervised learning models whose error rates are not easily determined due to the lack of labels. In transaction prediction, the objective function may correspond to the difference between the model's predicted outcomes and the manually recorded outcomes in the training sets. In various embodiments, the error rate may be measured as cross-entropy loss, L1 loss (e.g., the sum of absolute differences between the predicted values and the actual value), L2 loss (e.g., the sum of squared distances).

Figure 6:
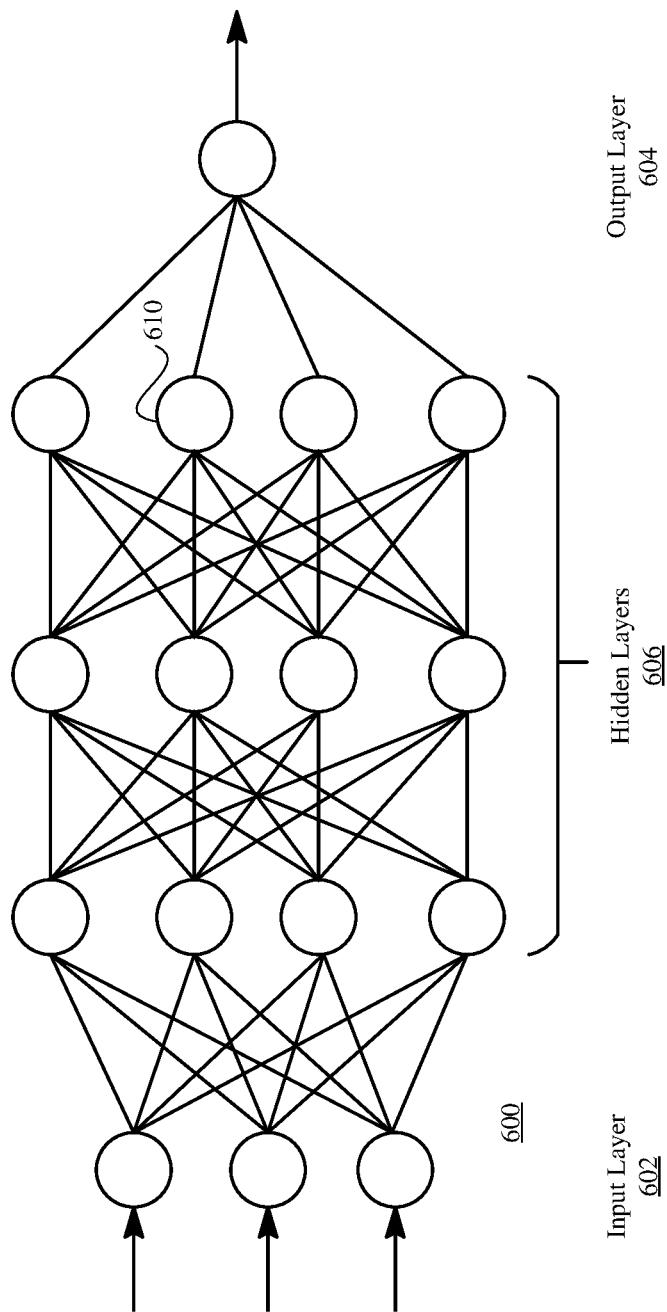
FIG. 6 is a conceptual diagram illustrating a structure of an example neural network is illustrated, in accordance with some embodiments.

Referring to FIG. 6, a structure of an example neural network is illustrated, in accordance with some embodiments. The neural network 600 may receive an input and generate an output. The neural network 600 may include different kinds of layers, such as convolutional layers, pooling layers, recurrent layers, full connected layers, and custom layers and different nodes 610. A convolutional layer convolves the input of the layer (e.g., an image) with one or more kernels to generate different types of images that are filtered by the kernels to generate feature maps. Each convolution result may be associated with an activation function. In some embodiments, a pair of convolutional layer may be followed by a recurrent layer that includes one or more feedback loop. The feedback may be used to account for spatial relationships of the features in text or temporal relationships of objects. The layers and may be followed in multiple fully connected layers that have nodes connected to each other. The fully connected layers may be used for classification and object detection. In one embodiment, one or more custom layers may also be presented for the generation of a specific format of output. For example, a custom layer may be used for image segmentation for labeling pixels of an image input with different segment labels.

The order of layers and the number of layers of the neural network 600 may vary in different embodiments. In various embodiments, a neural network 600 includes one or more layers 602, 604, and 606, but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels (e.g., 3×3, 5×5, 7×7, etc.) and the numbers of kernels allowed to be learned may be different from other convolutional layers.

A machine learning model may include certain layers, nodes, kernels and/or coefficients. Training of a neural network, may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other images in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be iteratively performed. Training may be completed when the objective function has become sufficiently stable (e.g., the machine learning model has converged) or after a predetermined number of rounds for a particular set of training samples. The trained machine learning model can be used for performing prediction or another suitable task for which the model is trained.

Example Blockchain Architecture

Figure 7A:
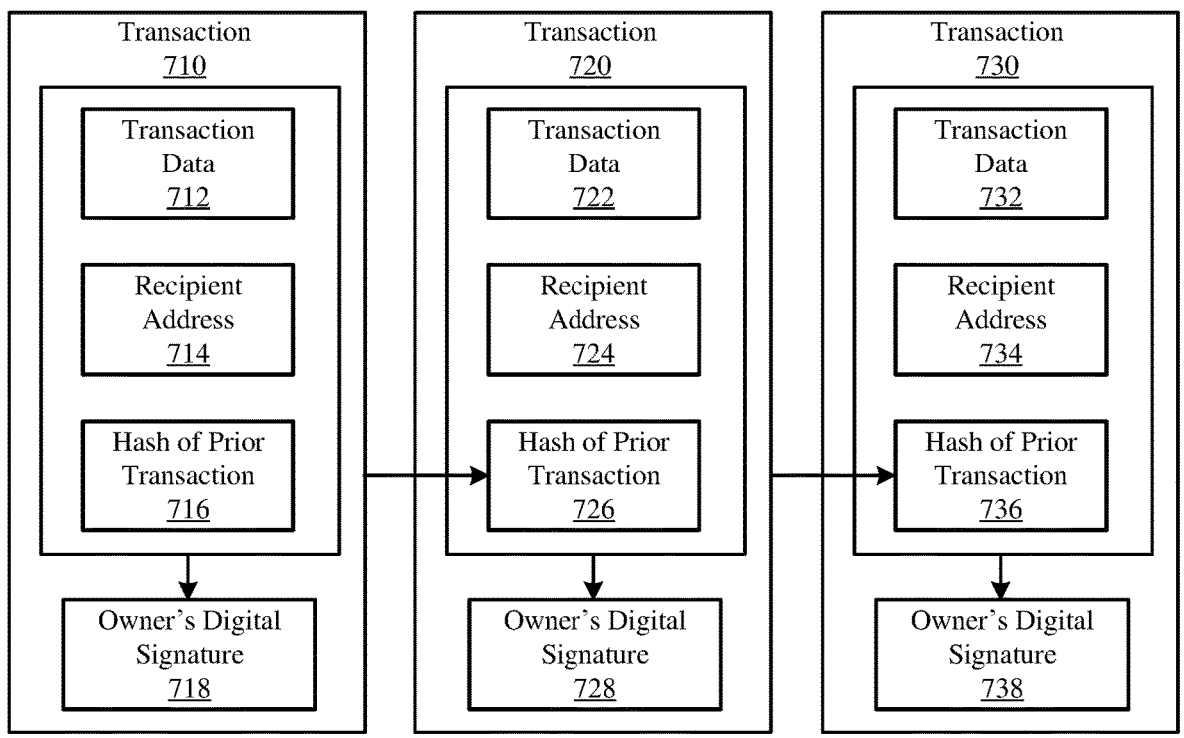
FIG. 7A is a block diagram illustrating a chain of transactions broadcasted and recorded on a blockchain, in accordance with an embodiment.

FIG. 7A is a block diagram illustrating a chain of transactions broadcasted and recorded on a blockchain, in accordance with an embodiment. The transactions described in FIG. 7A may correspond to any of the transactions and the transfer of blockchain-based units described in previous figures.

In some embodiment, a blockchain is a distributed system. A distributed blockchain network may include a plurality of nodes. Each node is a user or a server that participates in the blockchain network. In a public blockchain, any participant may become a node of the blockchain. The nodes collectively may be used as a distributed computing system that serves as a virtual machine of the blockchain. In some embodiments, the virtual machine or a distributed computing system may be simply referred to as a computer. Any users of a public blockchain may broadcast transactions for the nodes of the blockchain to record. Each user's digital wallet is associated with a private cryptographic key that is used to sign transactions and prove the ownership of a blockchain-based unit.

The ownership of a blockchain-based unit may be traced through a chain of transactions. In FIG. 7A, a chain of transactions may include a first transaction 710, a second transaction 720, and a third transaction 730, etc. Each of the transactions in the chain may have a fairly similar structure except the very first transaction in the chain. The first transaction of the chain may be generated by a smart contract or a mining process and may be traced back to the smart contract that is recorded on the blockchain or the first block in which it was generated. While each transaction is linked to a prior transaction in FIG. 7A, the transaction does not need to be recorded on consecutive blocks on the blockchain. For example, the block recording the transaction 710 and the block recording the transaction 720 may be separated by hundreds or even thousands of blocks. The traceback of the prior block is tracked by the hash of the prior block that is recorded by the current block. In some embodiments, account model is used and transactions do not have any references to previous transactions. Transactions are not chained and does not contain the hash of the previous transaction.

Referring to one of the transactions in FIG. 7A, for illustration, the transaction 720 may be referred to as a current transaction. Transaction 710 may be referred to as a prior transaction and transaction 730 may be referred to as a subsequent transaction. Each transaction includes a transaction data 722, a recipient address 724, a hash of the prior transaction 726, and the current transaction's owner's digital signature 728. The transaction data 722 records the substance of the current transaction 720. For example, the transaction data 722 may specify a transfer of a quantity of a blockchain-based unit (e.g., a coin, a blockchain token, etc.). In some embodiments, the transaction data 722 may include code instructions of a smart contract.

The recipient address 724 is a version of the public key that corresponds to the private key of the digital wallet of the recipient. In one embodiment, the recipient address 724 is the public key itself. In another embodiment, the recipient address 724 an encoded version of the public key through one or more functions such as some deterministic functions. For example, the generation of the recipient address 724 from the public key may include hashing the public key, adding a checksum, adding one or more prefixes or suffixes, encoding the resultant bits, and truncating the address. The recipient address 724 may be a unique identifier of the digital wallet of the recipient on the blockchain.

The hash of the prior transaction 726 is the hash of the entire transaction data of the prior transaction 710. Likewise, the hash of the prior transaction 736 is the hash of the entire transaction data of the transaction 720. The hashing of the prior transaction 710 may be performed using a hashing algorithm such as a secure hash algorithm (SHA) or a message digest algorithm (MD). In some embodiments, the owner corresponding to the current transaction 720 may also use the public key of the owner to generate the hash. The hash of prior transaction 726 provides a traceback of the prior transaction 710 and also maintains the data integrity of the prior transaction 710.

In generating a current transaction 720, the digital wallet of the current owner of the blockchain-based unit uses its private key to encrypt the combination of the transaction data 722, the recipient address 724, and the hash of prior transaction 726 to generate the owner's digital signature 728. To generate the current transaction 720, the current owner specifies a recipient by including the recipient address 724 in the digital signature 728 of the current transaction 720. The subsequent owner of the blockchain-based unit is fixed by the recipient address 724. In other words, the subsequent owner that generates the digital signature 738 in the subsequent transaction 730 is fixed by the recipients address 724 specified by the current transaction 720. To verify the validity of the current transaction 720, any nodes in the blockchain network may trace back to the prior transaction 710 (by tracing the hash of prior transaction 726) and locate the recipient address 714. The recipient address 714 corresponds to the public key of the digital signature 728. Hence, the nodes in the blockchain network may use the public key to verify the digital signature 728. Hence, a current owner who has the blockchain-based unit tied to the owner's blockchain address can prove the ownership of the blockchain-based unit. In this disclosure, it can be described as the blockchain-based unit being connected to a public cryptographic key of a party because the blockchain address is derived from the public key. For example, the access control server 130 may own blockchain-based units in a machine learning model 235. The blockchain-based units are connected to one of the public cryptographic keys of the access control server 130.

The transfer of ownership of a blockchain-based unit may be initiated by the current owner of the blockchain-based unit. To transfer the ownership, the owner may broadcast the transaction that includes the digital signature of the owner and a hash of the prior transaction. A valid transaction with a verifiable digital signature and a correct hash of the prior transaction will be recorded in a new block of the blockchain through the block generation process.

Figure 7B:
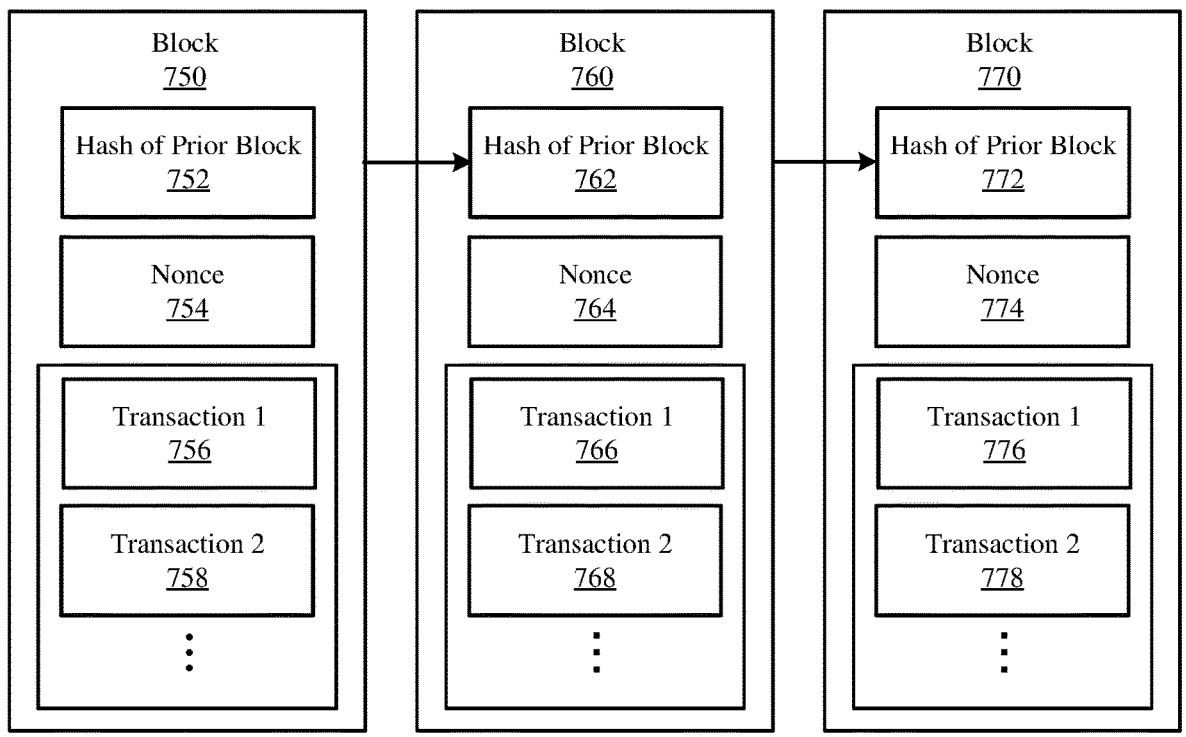
FIG. 7B is a block diagram illustrating a connection of multiple blocks in a blockchain, in accordance with an embodiment.

FIG. 7B is a block diagram illustrating a connection of multiple blocks in a blockchain, in accordance with an embodiment. Each block of a blockchain, except the very first block which may be referred to as the genesis block, may have a similar structure. The blocks 750, 760, and 760 may each include a hash of the prior blockchain 752, a nonce 754, and a plurality of transactions (e.g., a first transaction 756, a second transaction 758, etc.). Each transaction may have the structure shown in FIG. 7A.

In a block generation process, a new block may be generated through mining or voting. For a mining process of a blockchain, any nodes in the blockchain system may participate in the mining process. The generation of the hash of the prior block may be conducted through a trial and error process. The entire data of the prior block (or a version of the prior block such as a simplified version) may be hashed using the nonce as a part of the input. The blockchain may use a certain format in the hash of the prior block in order for the new block to be recognized by the nodes as valid. For example, in one embodiment, the hash of the prior block needs to start with a certain number of zeroes in the hash. Other criteria of the hash of the prior block may also be used, depending on the implementation of the blockchain.

In a voting process, the nodes in a blockchain system may vote to determine the content of a new block. Depending on the embodiment, a selected subset of nodes or all nodes in the blockchain system may participate in the votes. When there are multiple candidates new blocks that include different transactions are available, the nodes will vote for one of the blocks to be linked to the existing block. The voting may be based on the voting power of the nodes.

By way of example of a block generation process using mining, in generating the hash of prior block 762, a node may randomly combine a version of the prior block 750 with a random nonce to generate a hash. The generated hash is somewhat a random number due to the random nonce. The node compares the generated hash with the criteria of the blockchain system to check if the criteria are met (e.g., whether the generated hash starts with a certain number of zeroes in the hash). If the generated hash fails to meet the criteria, the node tries another random nonce to generate another hash. The process is repeated for different nodes in the blockchain network until one of the nodes find a hash that satisfies the criteria. The nonce that is used to generate the satisfactory hash is the nonce 764. The node that first generates the hash 762 may also select what transactions that are broadcasted to the blockchain network are to be included in the block 760. The node may check the validity of the transaction (e.g., whether the transaction can be traced back to a prior recorded transaction and whether the digital signature of the generator of the transaction is valid). The selection may also depend on the number of broadcasted transactions that are pending to be recorded and also the fees that may be specified in the transactions. For example, in some embodiments, each transaction may be associated with a fee (e.g., gas) for having the transaction recorded. After the transactions are selected and the data of the block 760 is fixed, the nodes in the blockchain network repeat the trial and error process to generate the hash of prior block 772 by trying different nonce. In embodiments that use voting to generate new blocks, a nonce may not be needed. A new block may be linked to the prior block by including the hash of the prior block.

New blocks may be continued to be generated through the block generation process. A transaction of a blockchain-based unit (e.g., an electronic coin, a blockchain token, etc.) is complete when the broadcasted transaction is recorded in a block. In some embodiment, the transaction is considered settled when the transaction is considered final. A transaction is considered final when there are multiple subsequent blocks generated and linked to the block that records the transaction.

In some embodiments, some of the transactions 756, 758, 766, 768, 776, 778, etc. may include one or more smart contracts. The code instructions of the smart contracts are recorded in the block and are often immutable. When conditions are met, the code instructions of the smart contract are triggered. The code instructions may cause a computer (e.g., a virtual machine of the blockchain) to carry out some actions such as generating a blockchain-based unit and broadcasting a transaction documenting the generation to the blockchain network for recordation.

Computing Machine Architecture

Figure 8:
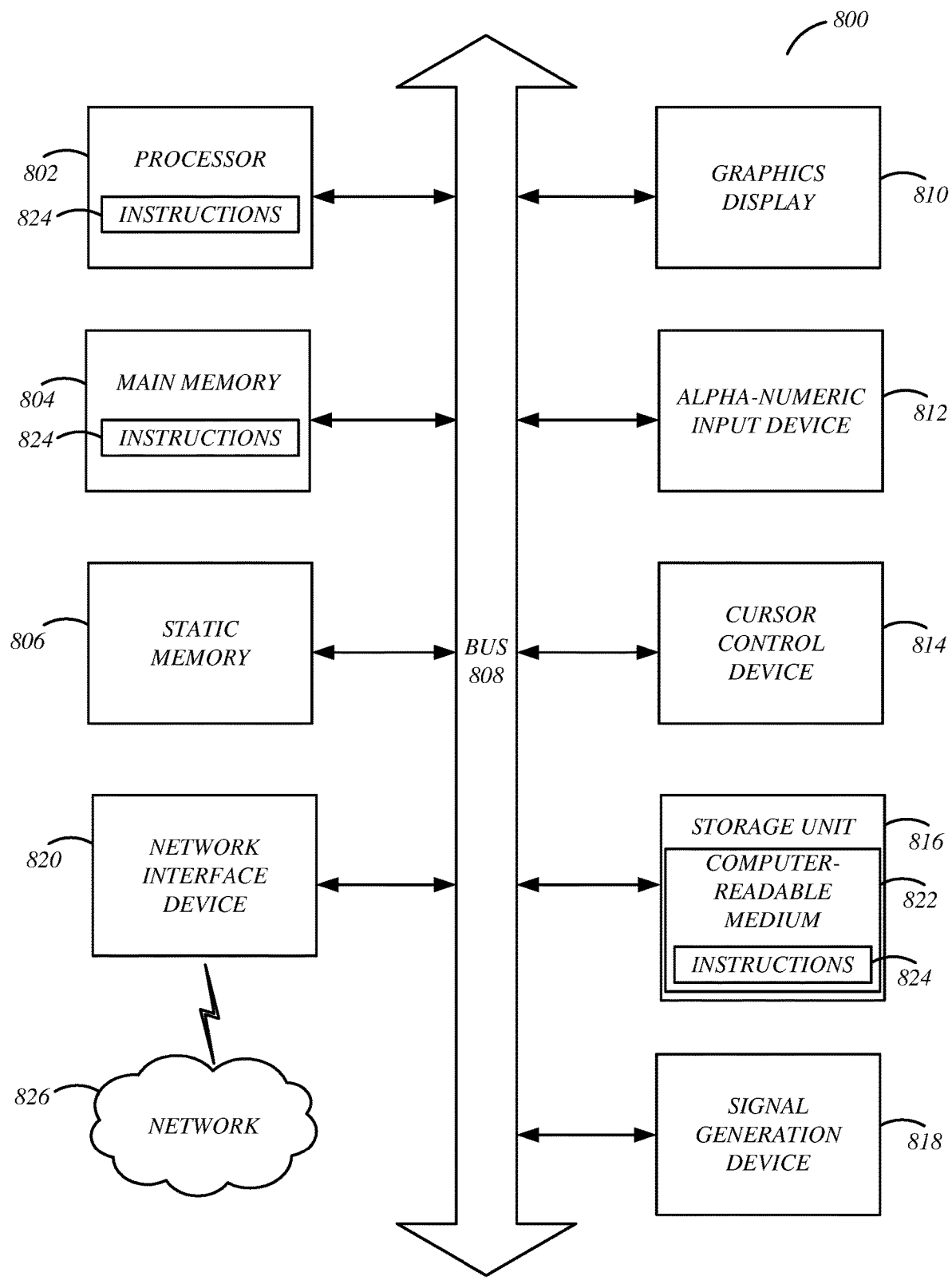
FIG. 8 is a block diagram illustrating components of an example computing machine that is capable of reading instructions from a computer-readable medium and execute them in a processor (or controller).

FIG. 8 is a block diagram illustrating components of an example computing machine that is capable of reading instructions from a computer-readable medium and execute them in a processor (or controller). A computer described herein may include a single computing machine shown in FIG. 8, a virtual machine, a distributed computing system that includes multiples nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1 and 2, including but not limited to, the user device 110, the access control server 130, a node of a blockchain network, and various engines, modules interfaces, terminals, and machines shown in FIG. 2. While FIG. 8 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors (generally, processor 802) (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

Additional Configuration Considerations

Beneficially, with various embodiments described in this disclosure, in a cryptographically proofed, cost-efficient way, smart contract (or other Web3 application) owners could add an interface to their applications to have control over the applications after being deployed to the blockchain. In addition, the application publishers could also apply security technologies to control the applications in real-time. Since the interactions would be vetted and signed by the access control system before the interaction request reaches the application on the blockchain, the access control server can block and prevent malicious or unwanted actions.

Certain embodiments are described herein as including logic or a number of components, engines, modules, or mechanisms, for example, as illustrated in FIG. 2. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A computer-implemented method, comprising:
   storing a private cryptographic key outside of a blockchain and in an access control server, the private cryptographic key belonging to the access control server, wherein the private cryptographic key corresponds to a public cryptographic key, a copy of the public cryptographic key is stored on the blockchain in a smart contract that is recorded on the blockchain;
   receiving, by the access control server, an access control setting related to the smart contract, the access control setting specifying one or more policies in granting access to the smart contract;
   receiving a plurality of requests for accessing the smart contract stored on the blockchain, the plurality of requests comprising a first request from a first user and a second request from a second user, the first user being different from the second user;
   determining, for each of the plurality of requests, whether the request is in compliance with the one or more policies specified in the access control setting, compliant requests comprising the first request and the second request;
   creating, by the access control server using the private cryptographic key, a first digital signature of the access control server and a second digital signature of the access control server, the first digital signature verifying the first request from the first user and the second digital signature verifying the second request from the second user;
   generating a first response to the first request, the first response comprising the first digital signature of the access control server, wherein the smart contract, in response to receiving the first digital signature, verifies the first digital signature using the public cryptographic key stored in the smart contract, and wherein a first successful verification of the first digital signature is required by the smart contract to process the first request from the first user; and
   generating a second response to the second request, the second response comprising the second digital signature of the access control server, wherein the smart contract, in response to receiving the second digital signature, verifies the second digital signature using the public cryptographic key stored in the smart contract, and wherein a second successful verification of the digital signature is required by the smart contract to process the second request from the second user.

2. The computer-implemented method of claim 1, wherein the digital signature comprises context data of the request.

3. The computer-implemented method of claim 1, wherein the request comprises a function call to the smart contract.

4. The computer-implemented method of claim 1, wherein the access control setting comprises settings with respect to a plurality of function calls.

5. The computer-implemented method of claim 4, wherein the access control setting with respect to one of the function calls is unrestricted and the first digital signature for the first request with respect to the one of the function calls is generated unconditionally.

6. The computer-implemented method of claim 1, wherein determining the first request is in compliance with the one or more policies is conducted using a machine learning model.

7. The computer-implemented method of claim 1, wherein the smart contract contains code that is generated by the access control server.

8. A system, comprising:
   one or more processors; and
   memory coupled to the one or more processors, the memory configured to store code comprising instructions, wherein the instructions, when executed by the one or more processors, cause the one or more processors to:
   store a private cryptographic key outside of a blockchain and in an access control server, the private cryptographic key belonging to the access control server, wherein the private cryptographic key corresponds to a public cryptographic key, a copy of the public cryptographic key is stored on the blockchain in a smart contract that is recorded on the blockchain;
   receive, by the access control server, an access control setting related to the smart contract, the access control setting specifying one or more policies in granting access to the smart contract;
   receive a plurality of requests for accessing the smart contract stored on the blockchain, the plurality of requests comprising a first request from a first user and a second request from a second user, the first user being different from the second user;
   determine, for each of the plurality of requests, whether the request is in compliance with the one or more policies specified in the access control setting, compliant requests comprising the first request and the second request;
   create, by the access control server using the private cryptographic key, a first digital signature of the access control server and a second digital signature of the access control server, the first digital signature verifying the first request from the first user and the second digital signature verifying the second request from the second user;
   generate a first response to the first request, the first response comprising the first digital signature of the access control server, wherein the smart contract, in response to receiving the first digital signature, verifies the first digital signature using the public cryptographic key stored in the smart contract, and wherein a first successful verification of the first digital signature is required by the smart contract to process the first request from the first user; and generate a second response to the second request, the second response comprising the second digital signature of the access control server, wherein the smart contract, in response to receiving the second digital signature, verifies the second digital signature using the public cryptographic key stored in the smart contract, and wherein a second successful verification of the digital signature is required by the smart contract to process the second request from the second user.

9. The system of claim 8, wherein the digital signature comprises context data of the request.

10. The system of claim 8, wherein the request comprises a function call to the smart contract.

11. The system of claim 8, wherein the access control setting comprises settings with respect to a plurality of function calls.

12. The system of claim 11, wherein the access control setting with respect to one of the function calls is unrestricted and the first digital signature for the first request with respect to the one of the function calls is generated unconditionally.

13. The system of claim 8, wherein determining the first request is in compliance with the one or more policies is conducted using a machine learning model.

14. The system of claim 8, wherein the smart contract contains code that is generated by the access control server.

15. A system, comprising:
- a smart contract recorded on a blockchain, wherein the smart contract includes a copy of a public cryptographic key stored on the blockchain in the smart contract;
- an access control server operating independent of the blockchain, the access control server comprising one or more processors and memory coupled to the one or more processors, the memory configured to store code comprising instructions, wherein the instructions, when executed by the one or more processors, cause the one or more processors to:
  - store a private cryptographic key outside of the blockchain and in the access control server, the private cryptographic key belonging to the access control server, wherein the private cryptographic key corresponds to the public cryptographic key, a copy of the public cryptographic key is stored on the blockchain in the smart contract that is recorded on the blockchain;
  - receive, by the access control server, an access control setting related to the smart contract, the access control setting specifying one or more policies in granting access to the smart contract;
  - receive a plurality of requests for accessing the smart contract stored on the blockchain, the plurality of requests comprising a first request from a first user and a second request from a second user, the first user being different from the second user;
  - determine, for each of the plurality of requests, whether the request is in compliance with the one or more policies specified in the access control setting compliant requests comprising the first request and the second request;
  - create, by the access control server using the private cryptographic key, a first digital signature of the access control server and a second digital signature of the access control server, the first digital signature verifying the first request from the first user and the second digital signature verifying the second request from the second user;
  - generate a first response to the first request, the first response comprising the first digital signature of the access control server; and
  - generate a second response to the second request, the second response comprising the second digital signature of the access control server;

wherein the smart contract is configured to, in response to receiving the first digital signature, verifies the first digital signature using the public cryptographic key stored in the smart contract, and wherein a first successful verification of the first digital signature is required by the smart contract to process the first request from the first user and, in response to receiving the second digital signature, verifies the second digital signature using the public cryptographic key stored in the smart contract, and wherein a second successful verification of the digital signature is required by the smart contract to process the second request from the second user.

16. The system of claim 15, wherein the digital signature comprises context data of the request.

17. The system of claim 15, wherein the request comprises a function call to the smart contract.

18. The system of claim 15, wherein the access control setting comprises settings with respect to a plurality of function calls.

19. The system of claim 18, wherein the access control setting with respect to one of the function calls is unrestricted and the first digital signature for the first request with respect to the one of the function calls is generated unconditionally.

20. The system of claim 15, wherein determining the first request is in compliance with the one or more policies is conducted using a machine learning model.

21. The system of claim 15, wherein the smart contract contains code that is generated by the access control server.

* * * * *